SOLOMAN L. BIGNALL.
Improvement in Driven Wells.
No. 4,604. Reissued Oct. 24, 1871.
FIG II
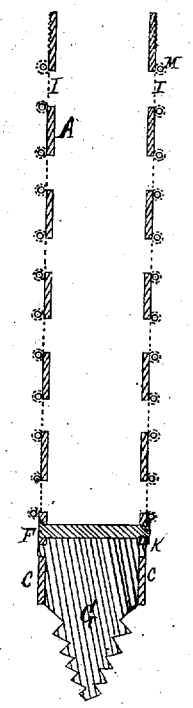
FIG I
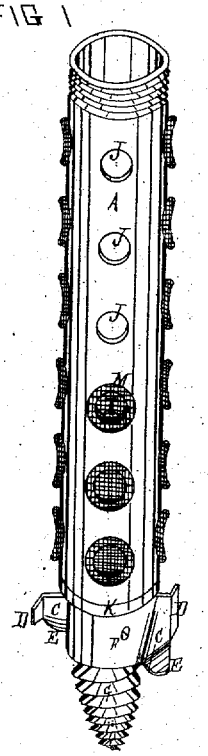
FIG IV
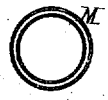
FIG V
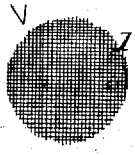
FIG VI
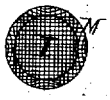
FIG III
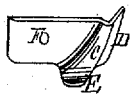
FIG VII
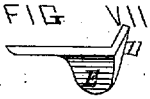
WITNESSES
Saml. Stuck Jr
George P. Pope
INVENTOR
Soloman L. Bignall
By G. A. Lehmann
Atty

UNITED STATES PATENT OFFICE.

SOLOMON L. BIGNALL, OF CHICAGO, ILLINOIS.

IMPROVEMENT IN TUBE-WELLS.

Specification forming part of Letters Patent No. 92,569, dated July 13, 1869; reissue No. 4,604, dated October 24, 1871.

*To all whom it may concern:*

Be it known that I, SOLOMON L. BIGNALL, of Chicago, in the county of Cook and State of Illinois, have invented a new and useful Improvement in Tube-Wells, of which the following is a specification:

The nature of the present invention consists: First, in the novel construction of the device for removing the earth as the tube is being put down, and so packing it as to make a hole somewhat larger than the tube, thereby allowing the latter to be sunk to a great depth by hand-power in any soil where there are no stones. Secondly, in forming the wire-cloth used for screening purposes over rings which are so bent as to fit the periphery of the pipe to which they are soldered for protecting the wire-cloth without weakening the tubing, as the whole is hereinafter described and shown.

Figure 1 is a perspective view of my improved well-point; Fig. 2, a central section of the same; Fig. 3, a perspective view of one wing of the sinking and packing device removed from the point; Fig. 4, the ring to which the wire-cloth is attached; Fig. 5, the wire-cloth before it is formed over the ring; Fig. 6, a view of the wire-cloth as it is formed over the ring preparatory to being soldered to the tube; Fig. 7, a top view of one of the wings.

A represents the lower end of an ordinary pipe used in sinking tube-wells, and J J show the holes through which the water passes into it. G represents a metal screw-point, which is placed inside of the tube A and fastened there by means of a bolt or otherwise, as most convenient. It is not necessary, however, for sinking wells in sandy soil, that the point G should have a screw-thread, a plain conical point being sufficient to guide the tube. Wings C, made of steel or iron, according to the service required, are bolted fast to the point G, between the screw-threads and a shoulder, K, the opposite sides of the point being flattened or cut away for this purpose. These wings extend out a short distance beyond the periphery of the tube A, and are provided with shovel-shaped lips E on their lower edge for loosening the soil as the tube is being sunk, and with flanges D on their outer ends for the purpose of so packing the earth surrounding the hole as it is loosened as to form a wall sufficiently compact to relieve the tube A from any considerable friction, which would otherwise result if the earth were permitted to fall back against it. In manufacturing the points it is not necessary that the wings should be bolted to the screw-point G, as the whole can be readily cast in the proper form of malleable iron or other metal. There may be instances, however, in which the nature of the earth may require a steel point throughout. In any case the lips E should have a pitch of about sixty degrees and the flanges D inclined outward a little from the wings C, as shown at Fig. 7. By means of a point thus constructed a tube-well may be sunk to a much greater depth than when driving is wholly relied on, and at much less cost than when the earth is carried to the surface with an auger, saving at the same time the expense of a driving or boring-machine, and also the trouble of moving one from place to place. The holes J J are covered with wire-cloth, as follows: A series of rings, M, Fig. 4, corresponding to the number of holes J through the tube A, is so covered with circular pieces of wire-cloth I as to project above the area of the inclosed parts through which the water passes. This is generally done with dies made for the purpose, but the edges of the circular piece I may be quickly formed over the wings by hand, care being taken, however, not to cut the pieces of wire-cloth so large as to more than overlap the rings. The rings, with the wire-cloth on, are then so formed by a die or otherwise as to closely fit the periphery of the tube, (surrounding the holes J J, &c.,) to which they are fastened with solder to the outside of tube; or the wire-cloth can be fastened to the tube by solder alone if the solder forms a ring around the wire-cloth, so that the latter is protected when the point is being sunk. By means of this arrangement the wire-cloth is held much more firmly in place than when simply secured by the solder alone, while at the same time the additional cost of rings is saved by solder. The rings projecting beyond the wire-cloth protect the latter from wear or displacement when the well is being sunk. The arrangement for protecting the wire-cloth and holding it in place is much more simple than countersinking the wire below the periphery of the pipe-tube, inasmuch as no drilling is required, while at the same time the tube is not weakened by the counter-sinks. This latter consideration is an important one, for in order to procure the proper quantity of water a large number of holes have to be made in the tube, and if the holes have their margins countersunk to receive the wire-cloth the tube is very much weakened, so much so as to buckle when being put down.

The operation is very simple, requiring only that the tube A have a length of pipe screwed fast to it, and turned into the earth by ordinary T-couplings in the usual manner or other means now used for like purpose, other lengths of pipe being fastened to the preceding ones until water is reached. If the screens fill up the whole tubing can be lifted out of the earth where the well is of moderate depth; but if it is very deep the tubing may have to be rotated when being hoisted out.

Having thus fully described my invention, what I claim, and desire to secure by Letters Patent of the United States, is—

1. A tube-well, A, provided with a point, G, and wings C, said wings being provided with lips E for loosening the earth and with flanges D for packing the walls of the hole, as set forth.

2. In combination with the tube A the rings M and wire-cloth I, said cloth being formed over the rings and the rings formed to fit the periphery of the tube, to which they are soldered, as set forth.

3. The wire-cloth I, secured to the tube A by a ring of solder, with the wire ring, as set forth.

SOLOMON L. BIGNALL.

Witnesses:
G. L. CHAPIN,
E. B. WIGHT.

(51)